Jan. 13, 1970     P. L. STURLA ET AL     3,489,080
ADJUSTABLE FEEDER BACK FOR A BALING MACHINE
Filed June 26, 1968
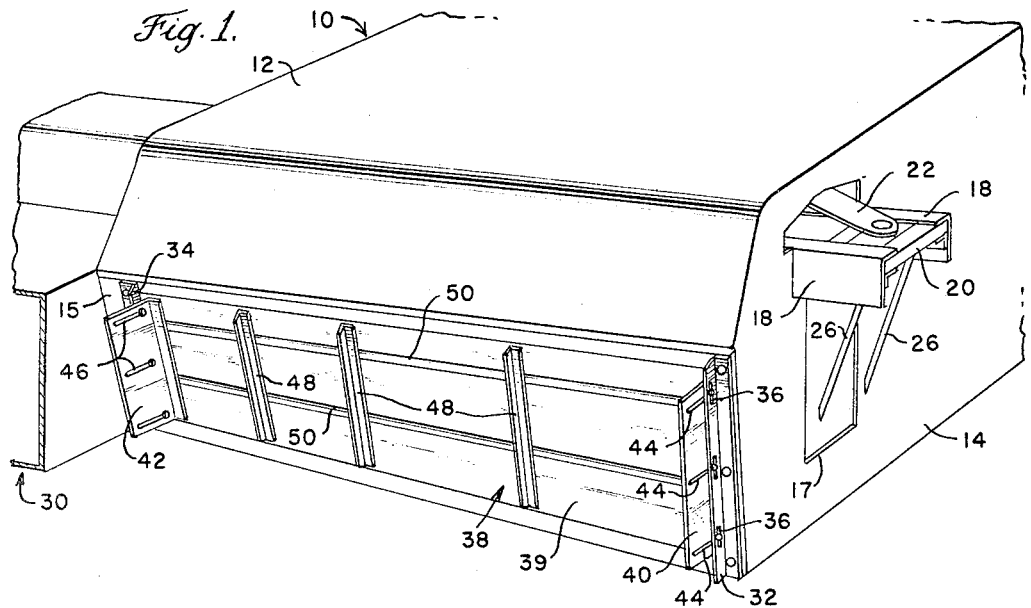
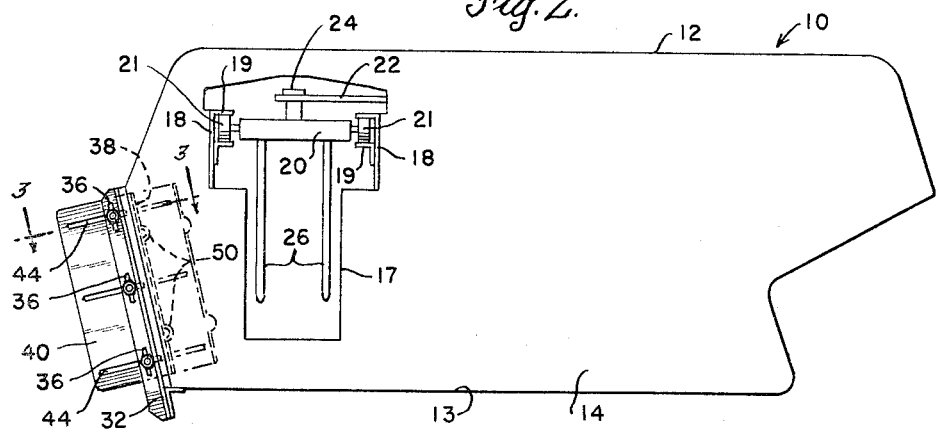
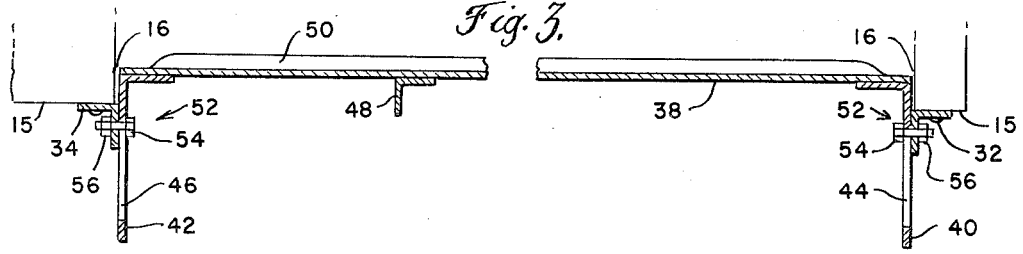
INVENTORS
PETER L. STURLA
& LEROY A. CRAWFORD
BY John E. Becker
ATTORNEY

United States Patent Office 3,489,080
Patented Jan. 13, 1970

3,489,080
ADJUSTABLE FEEDER BACK FOR A BALING MACHINE
Peter L. Sturla, Churchtown, and Le Roy A. Crawford, New Holland, Pa., assignors to Sperry Rand Corporation, New Holland, Pa., a corporation of Delaware
Filed June 26, 1968, Ser. No. 740,314
Int. Cl. A01f *15/10*
U.S. Cl. 100—188                                    5 Claims

ABSTRACT OF THE DISCLOSURE

A device for a hay baling machine for maintaining the proper distance relationship between the feeding means and the back of the feed chamber comprising an adjustable feeder back mounted along the rear wall of the feed chamber such that feeder back may be moved relative to the feeding means in a fore-and-aft or an angular direction, or an infinite combination thereof within the range of adjustment.

BACKGROUND OF THE INVENTION

This invention relates to an automatic hay baling machine of the type shown in U.S. Patent 3,115,823 in which gathered crop material is picked up from the ground and delivered to a feed chamber and from there it is conveyed into a bale case by feeder means to be formed into a hay bale. Specifically, the invention is directed to the addition of feeder back at the rearward end of the feed chamber which is adjustable with respect to the feed chamber and the feed means to maintain the proper distance relationship therebetween.

One of the problems in operating hay balers generally where the pick-up means on the baler operates continuously, is to insure that the many different types of crop materials which might be baled are fed properly into the bale forming chamber to maintain a constant flow of material and produce a bale of uniform shape and density.

Each type of crop material, from the green and more easily handled alfalfa type crops to the stiffer straw materials, requires different methods of handling by the baler to insure properly formed bales. Previously, baler manufacturers have equipped the balers with "false" feeder backs, made of metal or the like, which were bolted into the feed chamber behind the feeding means. The "false" feeder backs were necessary when the baler was being used to bale straw like material, because without them, the straw would tend to build up along the rear wall of the feed chamber, making the material inaccessible to the feeding means, and therefore, the bale shape and density was materially effected. With the "false" feeder back bolted in place ahead of the rear wall of the feeder chamber, the straw material is kept in close proximity to the feeding means so that a full charge of material is delivered to the bale case.

When alfalfa or other types of green crops are baled, then there is no need for the "false" feeder back. In fact, the use of such a device when baling the alfalfa type material, actually reduces the capacity of the baler. Therefore, in alfalfa crops the "false" feeder back must be removed.

In either case, whether the farmer is required to take the "false" feeder back out, or put it back in, a considerable amount of work must be done. This adjustment represents a considerable disadvantage to the "false" feeder back device when in use, and even more so when the farmer was planning to bale straw material in one field and then move on to an alfalfa type crop in another field. There is no convenient means or method available to make a simple adjustment of the feeder back.

SUMMARY OF THE INVENTION

Accordingly, the instant invention presents a relatively simple and inexpensive feeder back device which is adjustable relative to the feed chamber and the feeding mechanism.

The device is easily adjustable from the exterior of the baling machine. Within the range of adjustment, the feeder back is infinitely adjustable, since the cooperation of vertical and horizontal slots with the connecting means permits the feeder back to be moved both fore-and-aft and angularly with respect to the feeding means. In this way, the back may be moved forwardly into the feed chamber during the baling of straw materials and rearwardly to the normal back wall position during the baling of alfalfa crops, or the like. For materials between alfalfa and straw, the feeder back may be suitably adjusted to insure a constant material flow to the bale chamber and produce a bale of uniform shape and density.

BRIEF DESCRIPTION OF THE DRAWINGS

FIGURE 1 is a partial prospective view of a hay baling machine with the feeder back adjusted to its full out position;

FIGURE 2 is an end elevation view with the feeder back shown in the full out position of FIGURE 1 in the full lines and in its full in position in the dot-dash lines; and FIGURE 3 is an enlarged, partial plan view taken along the line 3—3 of FIG. 2.

DESCRIPTION OF THE PREFERRED EMBODIMENT

Referring generally to the drawings, FIGURE 1 shows a feed, or crop material receiving chamber 10 of a hay baling machine of the type shown in U.S. Patent 3,115,-823 and is adapted to move forwardly over the ground picking up cut crop material to form it into bales. The feeder or crop material receiving chamber 10 extends transversely to the direction of travel of the baler and is adapted to receive crop materials delivered thereto by pick-up means (not shown). The chamber 10 is comprised of a top wall 12, a bottom wall or floor 13, a pair of side walls 14 (only the outside wall shown) and a rear wall 15. The rear wall 15 of the chamber 10 is provided with an elongated, generally rectangular aperture 16 therein as illustrated in FIGURE 3. The aperture 16 encompasses the major portion of the chamber rear wall.

One side wall 14, shown in FIGURES 1 and 2, is provided with a suitably shaped aperture 17 through which a feeder mechanism carriage frame 18 extends. The carriage frame 18 is suitably mounted within the chamber 10 by suitable means (not shown) and extends thereacross and is comprised of a pair of spaced track or guide ways 19 which are adapted to provide a constraining or guiding means for a reciprocating feeder carriage 20. The carriage 20 is mounted in guides 19 by means of rollers 21, shown in FIGURE 2, or sliding within the guides as shown in FIGURE 1.

Reciprocating motion is provided by a linkage 22 which is pivotally connected by one end at 24 to the carriage 20. The other end (not shown) of linkage 22 is connected through suitable means to the baler gearbox (not shown) which transmits motive power to the baler. The details of the driving operation are described in detail in the above mentioned U.S. patent. A plurality of feed fingers 26 are fixed to and depend from carriage 20, as shown in FIGURES 1 and 2.

These fingers 26 are caused to sweep through the chamber 10 toward a bale case 30 which extends in a fore-and-aft direction along one side of the feed chamber, as illustrated in FIGURE 1. The bale case 30 is in communication with chamber 10 through an infeed opening (not shown) formed in the adjacent feeder chamber side wall. The bale case 30 is adapted to receive successive crop material charges therein and the material will subsequently be formed into a bale in case 30 by a plunger (not shown) reciprocating therein. The amount of material and the frequency at which it is fed into the bale chamber will be determinative of the shape and density of the bale which is formed.

A pair of angle or L-shaped brackets 32 and 34 are fixed to rear wall 15 of feeder chamber 10. One leg of each of the brackets 32 and 34 is fixed to rear wall 15 by means of rivets, welding, or the like. The brackets are spaced apart and are disposed in a parallel relation on either side of aperture 16, as shown in FIGURE 3. The other leg of the respective brackets, extends transversely outwardly from the rear wall and is provided with a plurality of spaced, elongated, vertically disposed slots 36 therein. The purpose of these slots will be hereinafter described in detail.

Extending between the brackets 32 and 34 and conforming generally to the rectangular shape of aperture 16 is a feeder back 38. The feeder back extends between the mounting brackets generally co-extensive with the feeder mechanism and is comprised of an elongated, generally rectangular panel portion 39 adapted to be received within aperture 16 with as little clearance as possible, and a pair of L-shaped wing members 40 and 42 which are fixed to each end of sheet portion 39 by any suitable means (not shown) by one leg of each wing. The other leg of the wing members, extends transversely rearwardly from the panel portion 39 and rear wall 15. Suitably spaced along the rearwardly extending wing members 40 and 42 are a plurality of elongated horizontally disposed slots 44 and 46, respectively. Each of these slots 44 and 46 is so positioned as to be in a cooperating relationship with the vertical slots 36 of the mounting brackets 32 and 34. The panel portion 39 is also provided a plurality of re-enforcing or brace members 48, which extended vertically across the sheet portion, and a plurality of channels or ribs 50 which also stiffen or generally strengthen the feeder back.

Adjustable connecting and locking means 52, shown generally in FIG. 3, are comprised of a bolt 54 and a nut 56. The bolt is adapted to be received in each slot combination 44-46, or 46-36, as shown in FIGURE 3, to connect the feeder back 38 to the mounting brackets 32 and 34.

In operation, the position of the feeder back may be freely adjusted within the limits of adjustment provided by the length of the slots. When it is desired to adjust the position of the feeder back with respect to the feeder mechanism because of a change in the crop material to be baled, the connecting and locking means 52 are loosened and the feeder back is moved to the desired position. The solid lines of FIG. 2 shows the feeder back in its furtherest rearward position, the position it would be in under normal baling conditions. However, when straw type materials are being baled it is desirable to move the feeder back forward to reduce the distance between the feeder back and the feeder mechanism to prevent, or, at least, reduce the substantial material build up which would otherwise occur. Under these baling conditions the feeder back may be adjusted so as to extend forwardly into chamber 10 to close the distance between the feeder back and the feeder mechanism. The fore-and-aft adjustment is accomplished by merely moving the feeder back and forth horizontally so that the position of the connecting means 52 in the slots 44 and 46 is changed. The inner most position of the feeder back is shown by the dot-dash lines in FIG. 2. When it is desired to change the angular position of the feeder back as well as the fore-and-aft position, the adjustment is similarly made by loosening the connecting means and employing a position which changed relative to the vertical slots 36 of the brackets 32 and 34 and the horizontal slots 42 and 44 of wings 40 and 42. As can be understood by those skilled in the art, the position of the feeder back is infinitely variable within the range of the adjustment length of the slots.

Having thus described our invention what we claim is:

1. In a hay baling machine, a feeder chamber for receiving crop material from the ground as the machine moves thereacross, said feeder chamber extending transversely to the direction of travel of said baling machine and having bottom, rear and side walls, a fore-and-aft extending bale forming chamber disposed along one of said side walls of said feeder chamber, an infeed opening in said feeder chamber side wall adjacent said bale chamber whereby the feeder chamber is in communication with the bale chamber, a feeder for conveying crop material in the feeder chamber into the bale chamber, mounting means spaced apart on said feeder chamber, said rear wall comprising a feeder back means extending between said mounting means generally coextensive with said feeder mechanism, and means for adjustably connecting said feeder back means to said mounting means and for locking the feeder back in the adjusted position whereby said feeder back is adjustably positionable with respect to said feeder mechanism.

2. In a hay baling machine as recited in claim 1, wherein said mounting means comprises a pair of L-shaped brackets connected by suitable means by one leg along the rear portion of said feeder chamber adjacent the side walls thereof and the second leg of said brackets extending outwardly therefrom, said second leg being provided with a plurality of vertical slots therein.

3. In a hay baling machine as recited in claim 1, wherein said feeder back means comprises an elongated rectangular panel portion and a pair of wing portions disposed at the ends of said panel portion and extending transversely rearwardly therefrom, said wing having a plurality of generally horizontally disposed elongated slots therein.

4. In a hay baling machine as recited in claim 1, wherein means for adjustably connecting and locking said feeder back means to said mounting means extends through the slots of said mounting means and said feeder back wings whereby the position of said feeder back with respect to said feeder mechanism is adjustable both in a fore-and-aft and an angular direction through the cooperation of said slots and said connecting means.

5. In a hay baling machine, a crop material receiving chamber for receiving crop material from the ground extending transversely to the direction of travel of the baler, said chamber having bottom, rear and side walls, said rear wall having a rectangular aperture therein, a fore-and-aft extending bale forming chamber disposed along one of side walls of said crop receiving chamber, an infeed opening in said feeder chamber side wall adjacent said bale chamber whereby the feeder chamber is in communication with the bale chamber, a feeder mechanism mounted in said crop receiving chamber for conveying crop material received therein into said bale forming chamber, mounting means comprising a pair of spaced apart L-shaped brackets fixed to said rear wall of said crop receiving chamber by one leg of said bracket on each side of the aperture and the other leg of said bracket having a plurality of elongated vertically disposed slots therein, a feeder back means extending between said mounting brackets coextensive with said feeder mechanism and comprising a rectangular panel portion conforming generally to the configuration of the aperture in said rear wall and a pair of wing members on said panel portion at the ends thereof and extending transversely rearwardly therefrom, each of said wing members being provided with a plurality of elongated, horizontally disposed slots therein cooperating with the vertical slots of said mounting brackets, and means for adjustably connecting and locking said feeder back wings to said mounting brackets, said means extending through said cooperating slots, whereby said feeder back is infinitely adjustably positionable in a fore-and-aft and angular position with respect to said feeder mechanism within the range of adjustment provided.

References Cited

UNITED STATES PATENTS 2,757,602    8/1956    Nolt _____ 100—142

EDWARD L. ROBERTS, Primary Examiner

U.S. Cl. X.R.

100—142